Aug. 3, 1965 J. R. SCLAFANI 3,198,008
MACH NUMBER INDICATOR
Filed June 11, 1962 3 Sheets-Sheet 1

INVENTOR.
JOSEPH R. SCLAFANI
BY
Benj. T. Rauber
ATTORNEY

Aug. 3, 1965        J. R. SCLAFANI        3,198,008
MACH NUMBER INDICATOR
Filed June 11, 1962        3 Sheets-Sheet 2

TO PITOT TUBE

INVENTOR.
JOSEPH R. SCLAFANI
BY
Benj. T. Rauber
ATTORNEY

Aug. 3, 1965   J. R. SCLAFANI   3,198,008
MACH NUMBER INDICATOR

Filed June 11, 1962   3 Sheets-Sheet 3

INVENTOR.
JOSEPH R. SCLAFANI
BY
Benj. T. Rauber
ATTORNEY

United States Patent Office 3,198,008
Patented Aug. 3, 1965

3,198,008
MACH NUMBER INDICATOR
Joseph R. Sclafani, Old Greenwich, Conn., assignor to Aerotec Industries, Inc., Greenwich, Conn., a corporation of Connecticut
Filed June 11, 1962, Ser. No. 201,525
10 Claims. (Cl. 73—182)

My invention relates to an indicator to indicate when the speed of an object, such as an airplane, reaches a predetermined Mach number.

The Mach number is the ratio of the speed of an object to the speed of sound in the undisturbed medium in which the object is travelling. Thus, when an object is travelling at the speed of sound in the medium in which the object is travelling, the ratio is 1 and the Mach number is 1. When the ratio of the speed of the object to the speed of sound in the medium is 0.9 the Mach number is 0.9.

The speed of sound in air varies with the density of the air which, in turn, varies with the altitude, and decreases at higher altitudes inasmuch as the density of the air is less at higher altitudes.

The density of the air at any altitude may be determined by its pressure uninfluenced by the speed of the object. This is accomplished by so arranging the measuring instrument that there is no impingement of the air on the movable element exposed on one side to the air and on the other side to vacuum. This pressure is designated by the symbol $P_s$ indicating the absolute pressure of the static air that is, its pressure above zero or a perfect vacuum. The static pressure of air at sea level is about 30 inches of mercury, varying slightly with variations in barometric pressure, while the pressure of a vacuum is zero. At higher altitude, the static pressure decreases toward zero.

The speed of an object relative to the atmosphere is measured by the increment in pressure above the pressure of the atmosphere in which the object moves due to the impingement of the air on a receiving element exposed to this impingement or impact pressure and on the other side to static atmospheric pressure. This pressure is sometimes designated as ram pressure and is expressed by the symbol P. It may be measured through a Pitot tube pointed in the direction of travel of the object so that its open end receives the impact of the air creating a pressure above the static air pressure which is then imposed on one side of the moving element of a pressure indicator the other side of the moving element being exposed to static atmospheric pressure. The total, absolute pressure, that is, the total pressure above zero or vacuum, measured by the pressure measuring instrument is the sum of P plus $P_s$. If this total pressure be represented by $P_1$, then P would be equal to $P_1-P_s$ or $P=P_1-P_s$.

The Mach number may be represented graphically on a graph in which the abscissa is graduated to represent static pressures from normal atmospheric pressure at sea level to zero and P and the corresponding speed are represented by the ordinate from zero upwardly. The Mach number is then determined for various static atmospheric pressures and speeds by a straight line sloping upwardly toward the left, a positive slope. A Mach number of 1 would have one line, a Mach number of 0.9 would have a line to the left of the Mach 1 line and a Mach number of 0.8 a line spaced further to the left. The Mach numbers lines are not exactly parallel but converge to the point of zero pressure which is outside the range of normal application. An example of a graph showing lines representing Mach numbers is shown in FIG. 1.

In this figure the abscissa is graduated to show static pressures in inches of mercury from thirty inches to zero and in altitudes corresponding to these pressures. P is indicated by the ordinate in inches of mercury and in the speeds of the object relative to the atmosphere. The slope line 10 represents Mach number 0.905 and line 11 represents Mach number 0.895. Thus, for example, at an altitude of 30,000 feet and a static air pressure of 9 inches, Mach number 0.905 would be reached at a P of about 6.3 inches of mercury and an object speed of 350 knots per hour.

As the speed of an object approaches Mach 1, the speed of sound in the air at the altitude and pressure in which the object is travelling, dangerous or destructive vibrations are set up and it is therefore desirable, if not imperative, to keep the speed short of this Mach number as, for example at 0.9 Mach. My invention provides an instrument which gives a warning when a selected limiting Mach number less than 1 is reached so that the pilot of the plane may avoid exceeding this limit by reducing the speed of the plane or by dropping to a lower altitude and greater air density and pressure.

In an embodiment of my invention, I provide means whereby the pressure P produced by the speed of the object, that is, an airplane, for example, is imposed on one arm of a link or floating lever, the static pressure is imposed on the lever at a different point and in the same direction to move the lever in the direction of the forces. The lever is moved at each point of application of these forces proportionately to the force applied, namely P and $P_s$. At a point between these points of application the lever engages an electric switch, such as a micro switch or equivalent mechanism, to actuate an alarm or control mechanism.

The point of application of the combined pressures P and $P_s$ on the switch or equivalent element may be shifted along the lever, which would have the effect of changing the slope of the Mach lines in FIG. 1, and may be shifted toward or from the direction of translation of the lever, which would have the effect of shifting the position, to left or right, of the Mach lines, for example from the position of line 10 of FIG. 1 to the position of line 11.

The impact or ram pressure P may be measured, for example, by a Pitot tube opening in the direction of movement of the object and a bellows connected thereto and surrounded by the atmosphere. The absolute static pressure $P_s$ may be measured by an evacuated bellows exposed to the atmosphere and biased toward expansion by a spring so that the moving end of the bellows moves outwardly as the atmospheric pressure decreases. The moving ends of the ram pressure bellows and of the evacuated bellows may also actuate a switch respectively to indicate a speed limit and an altitude limit.

My invention is illustrated by way of example in the accompanying drawings in which.

Figure 1:
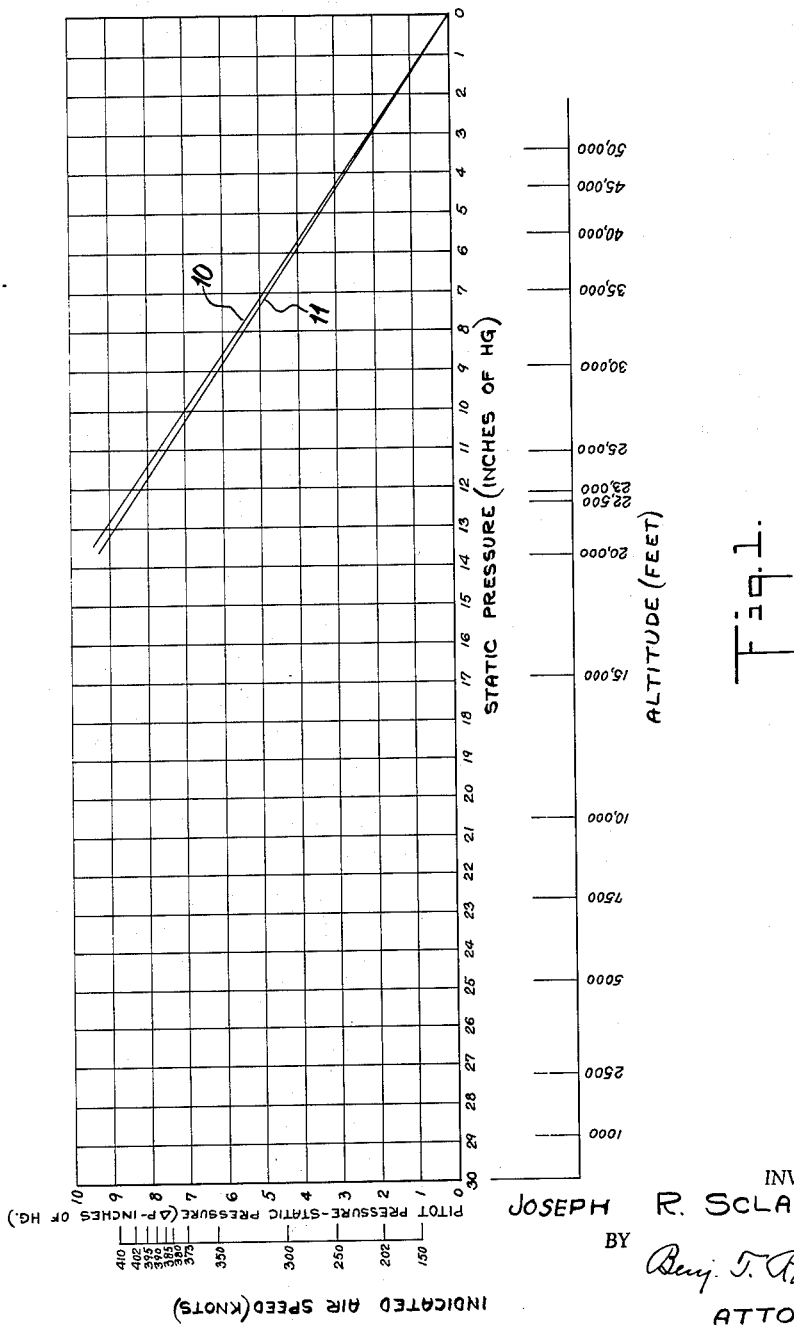
Figure 2:
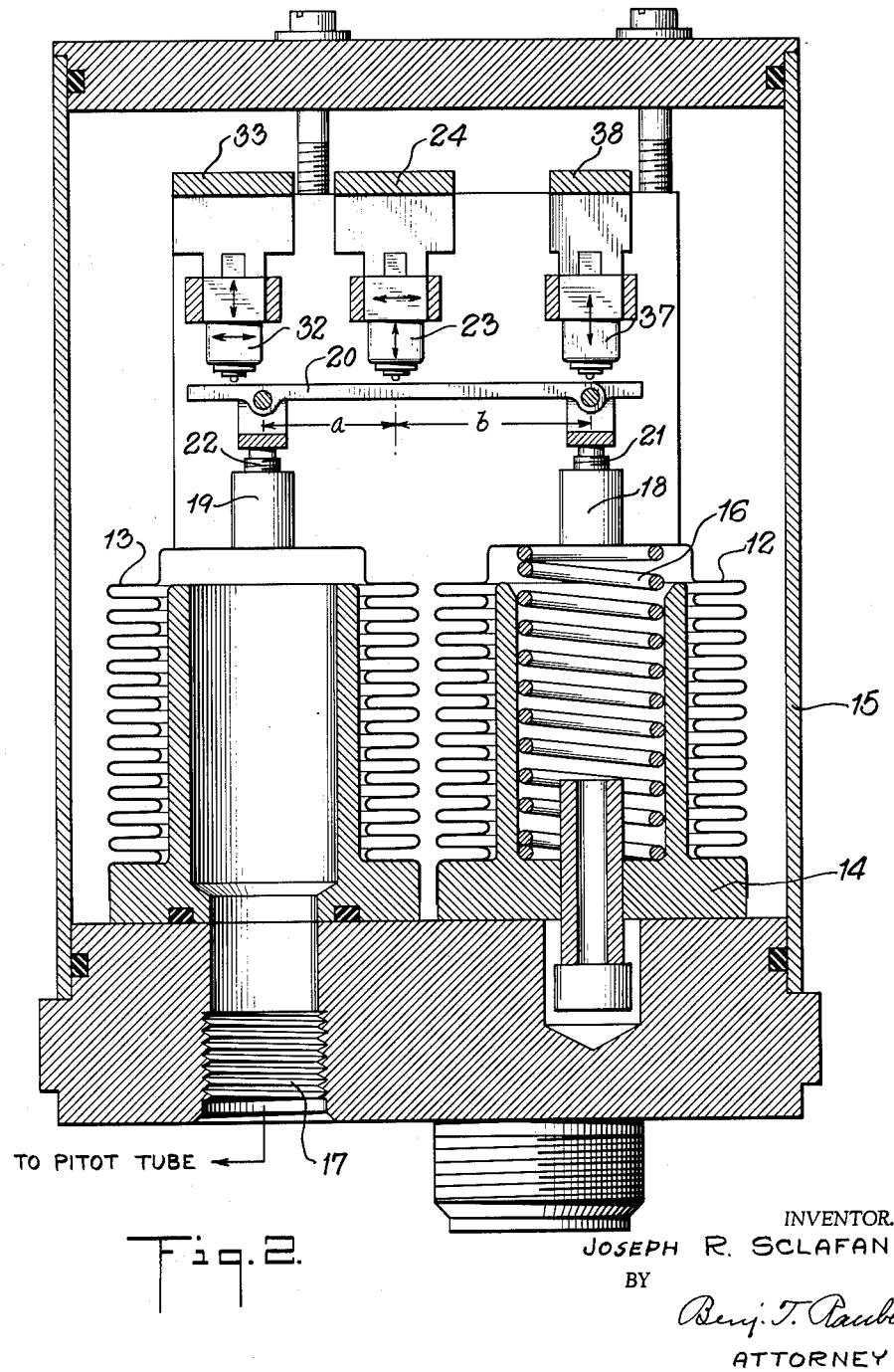
FIG. 2 is an elevation of a Mach number limit indicator embodying my invention, taken on line 2—2 of FIG. 3.

In the indicator shown in the drawings, an evacuated bellows 12 and a ram pressure bellows 13 are mounted in side-by-side relation on a common base 14 in an enclosing cabinet 15. The bellows 12 is evacuated as nearly as possible to zero pressure and the outer surface is exposed to the static air pressure in the cabinet, which is in communication with the atmosphere. The upper end of the bellows 12 is free to move and is biased upwardly or away from the base 14 by a helical spring 16 within the bellows and confined between the base and the upper end of the bellows. The pressure bellows 13 is connected through an inlet 17 to a Pitot tube, not shown, the open end of which is directed toward the direction of travel of the object carrying the indicator. The exterior of the bellows 13 is exposed to the static pressure of the atmosphere.

An upright stud 18 is mounted on the upper, movable, end of the bellows 16 and a similar stud 19 is mounted on the upper, movable, end of the bellows 13 and these studs are linked by a transverse, floating lever 20. The height of the connection of the lever to the studs 18 and 19 may be adjusted, respectively, by a screw connection 21 and 22. The connection of the lever to the studs is pivotal so that each end of the lever may be raised independently by its respective bellows. The lateral movements of the connections 21 and 22 as the lever 20 tilts being normally only of a few thousandths of an inch is permitted by the flexibility of the bellows 12 and 13.

Figure 3:
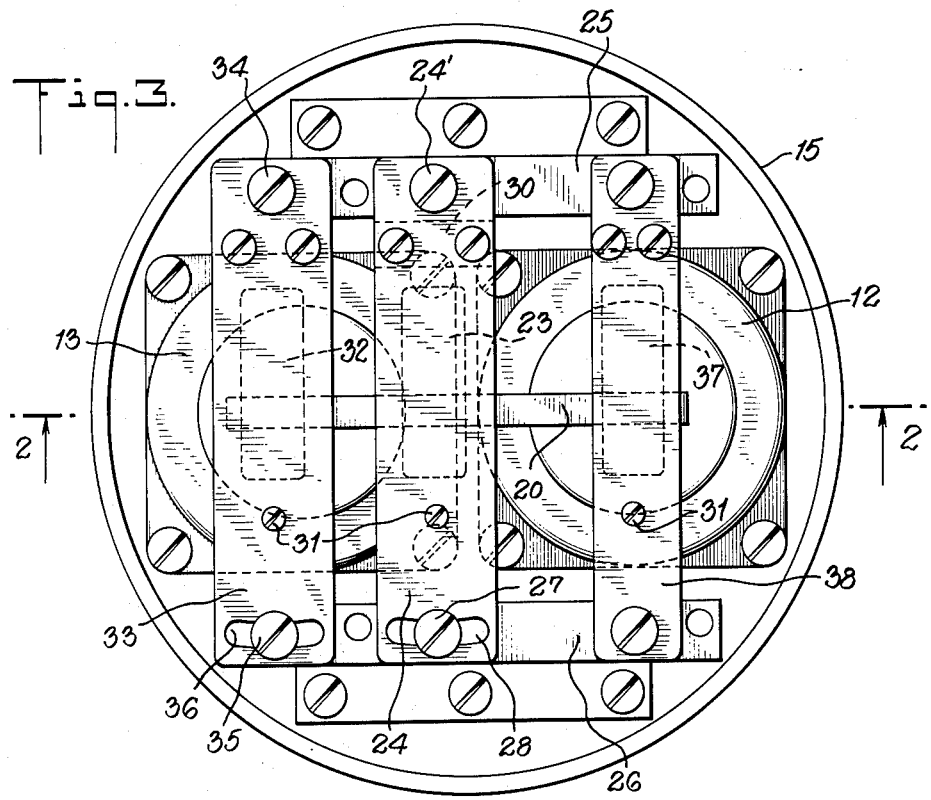
FIG. 3 is a plan view of the indicator shown in FIG. 2.

An electric switch 23 is mounted above the lever between the pivotal connections to the bellows. The position of the point of contact of the switch 23 on the lever is determined by the slope of the Mach line of FIG. 1. Thus the slope of line 10 being 7 to 10, that is, $x$ distance on the abscissa being 10 when $y$ on the ordinate is 7, the distance "$a$" between the points of pivoting of the bellows and the point of contact of the switch 23 would be ten units and the distance "$b$" between the point of contact of the switch 23 and the pivot point of the bellows would be seven units, the total distance between the pivotal points of the bellows being seventeen units. To enable the switch 23 to shift transversely to adjust it to a selected slope the switch is supported from a cross beam 24, one end of which is secured by a screw 24' in fixed position on a rear beam or shelf 25, FIG. 3, and the front end of which is adjustably secured on a front beam 26 by means of a screw 27 extending through an arcuate slot 28 in the cross beam. Upon loosening the screw 27, the beam 26 may be shifted and secured by tightening the screw.

Figure 4:
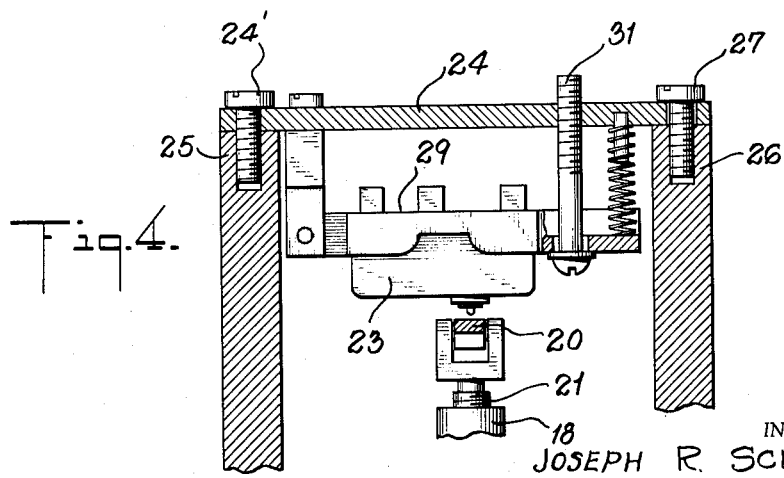
FIG. 4 is a detail of an adjustable switch support.

Lowering or raising the switch 23 relative to the lever 20 has the effect of shifting the Mach line of FIG. 1 horizontally. To enable the switch to be raised or lowered, it is suspended from a lever 29 pivoted at one end on bracket 30 depending from the beam 24 and adjustably supported at its other end by a screw 31 threaded into the beam 24 as shown in FIG. 4.

The speed limit of the airplane or other object relative to the atmosphere may be indicated by a speed limit switch 32 suspended from a cross beam 33 mounted at its ends on the supporting beams 25 and 26. The beam 33 is pivotally secured to the beam 25 by means of a screw 34 and adjustably secured at its other end to the beam 26 by a screw 35 in an arcuate slot 36. When the lower end of the switch 32 is directly above the point of support of the beam 20 by the bellows 13 the switch 32 indicates the speed limit unaffected by the atmospheric pressure or the altitude. It would be a speed limit indicated on the graph of FIG. 1 as a horizontal line. If the switch were shifted to the left of the pivotal support axis it would be affected by the static pressure and altitude and would be represented by a line on FIG. 1 sloping upwardly toward the right. If it were shifted to the right of the pivotal support of the beam 20, the speed limit would be indicated on FIG. 1 as a line sloping downwardly toward the right. The switch 32 may be raised or lowered by means of a support similar to that shown in FIG. 4.

The altitude limit is indicated by a switch 37 suspended from a transverse beam 38 directly above the point of support of the beam 20 by the bellows 12. It is not shiftable horizontally but may be raised or lowered by a support such as is shown in FIG. 4.

Having described my invention, I claim:

1. Apparatus for indicating a Mach number limit which comprises an evacuated bellows subject to the atmosphere, having one end fixed and the other end movable and biased outwardly toward the movable end, a pressure bellows exposed to the atmosphere and having a fixed end and a movable end, said pressure bellows having means to receive total static and ram pressure of a moving object to move the movable end of said bellows against static pressure outwardly from the fixed end, said evacuated bellows and said pressure bellows being in side-by-side position and expansible in the same direction, a floating lever linking the movable ends of said bellows, and an adjustably positionable contact means positioned between the points of linkage to said lever to be actuated by said lever.

2. The apparatus of claim 1 having supporting means for said contact means adjustable transversely to the direction of expansion of said bellows.

3. The apparatus of claim 1 having supporting means for said contact means adjustable in the direction of movement of said bellows.

4. The apparatus of claim 1 having means for supporting said contact means adjustable transversely and in the direction of expansion of said bellows.

5. The apparatus of claim 1 having a speed limit indicator element positioned to be actuated by said pressure bellows.

6. The apparatus of claim 5 having supporting means for said speed limit indicator adjustable transversely of the direction of expansion of said pressure bellows.

7. The apparatus of claim 5 having supporting means for said speed limit indicator adjustable in the direction of expansion of said bellows.

8. The apparatus of claim 5 having supporting means for said speed limit indicator adjustable transversely and in the direction of expansion of said pressure bellows.

9. The apparatus of claim 1 having an altitude indicator positioned to be actuated by said evacuated bellows.

10. The apparatus of claim 1 in which said contact means is an electric switch.

References Cited by the Examiner
UNITED STATES PATENTS

| | | | |
|---|---|---|---|
| 2,677,963 | 5/54 | Mullins | 73—182 |
| 2,740,295 | 4/56 | Perchonok | 60—39.28 X |
| 2,869,367 | 1/59 | Moore | 73—182 |
| 2,895,692 | 7/59 | Leduc | 244—76 |
| 2,934,898 | 5/60 | Graefe | 60—39.28 |

ISAAC LISANN, *Primary Examiner.*

LEONARD FORMAN, *Examiner.*